United States Patent [19]

Schulz et al.

[11] 4,390,661

[45] Jun. 28, 1983

[54] NOVEL COMPOSITION AND PROCESS FOR PRODUCING SOLID RESIN THEREFROM

[75] Inventors: Johann G. Schulz, Pittsburgh; Daniel Margosian, Verona, both of Pa.

[73] Assignee: Gulf Research & Development Company, Pittsburgh, Pa.

[21] Appl. No.: 382,945

[22] Filed: May 28, 1982

Related U.S. Application Data

[63] Continuation-in-part of Ser. No. 290,663, Aug. 6, 1981, Pat. No. 4,361,671.

[51] Int. Cl.$^3$ .................. C08G 63/42; C08G 63/76; C08G 63/66
[52] U.S. Cl. .................. 524/878; 524/876; 524/879; 527/500; 525/419; 528/365; 528/366
[58] Field of Search .............. 528/112, 115, 365, 366, 528/98; 524/878, 879; 527/500; 525/419

[56] References Cited

U.S. PATENT DOCUMENTS

| | | | |
|---|---|---|---|
| 2,965,587 | 12/1960 | Rickert | 527/500 |
| 3,201,360 | 8/1965 | Proops et al. | 528/112 X |
| 3,793,247 | 2/1974 | Fleming et al. | |

FOREIGN PATENT DOCUMENTS 13785  6/1980  European Pat. Off.

*Primary Examiner*—Earl A. Nielsen
*Attorney, Agent, or Firm*—Deane E. Keith; Forrest D. Stine; Joseph J. Carducci

[57] ABSTRACT

A novel composition of matter capable of being cured to a solid resinous material obtained as a result of the reaction of (1) a coal derivative comprising a mixture of monocyclic, polycyclic, multifunctional carboxylic acids, resulting from the interaction of coal with nitric acid with (2) an oxirane, and a process for producing a solid resinous material therefrom by heating the same under pressure.

59 Claims, No Drawings

NOVEL COMPOSITION AND PROCESS FOR PRODUCING SOLID RESIN THEREFROM

This application is a continuation-in-part application of our application Ser. No. 290,663, filed Aug. 6, 1981, for Novel Composition and Process for Producing Solid Resin Therefrom, now U.S. Pat. No. 4,361,671, issued Nov. 30, 1982.

BACKGROUND OF THE INVENTION

1. Field of the Invention

This invention relates to (A) a novel composition of matter capable of being cured to a solid resinous material obtained by reacting (1) a coal derivative comprising a mixture of monocyclic, polycyclic, multifunctional carboxylic acids resulting from the interaction of coal with nitric acid with (2) an oxirane, and then subjecting the resulting reaction product to treatment with hydrogen, and (B) a process for producing a solid resinous material therefrom by heating said novel composition of matter with a member selected from the group consisting of organic dicarboxylic acids, organic polycarboxylic acids, esters of said acids and anhydrides of said acids.

2. Description of Prior Art

Hard, structurally-stable resinous plastic materials, highly resistant to chemical attack from water, acids and bases, and having excellent insulating properties are widely used in commerce. It is highly desirable to employ materials for the preparation of such resinous plastic bodies that are inexpensive and readily available.

SUMMARY OF THE INVENTION

We have discovered a novel composition of matter made from materials that are inexpensive and readily available and that is capable of being cured to obtain hard, structurally-stable resinous plastic material, highly resistant to attack from water, acids and bases and which possesses excellent insulating properties.

The novel composition of matter claimed herein requires but three components:

(1) a coal derivative comprising a mixture of monocyclic, polycyclic, multifunctional carboxylic acids, resulting from the interaction of coal with nitric acid, hereinafter referred to as "coal derivatives,"

(2) an oxirane, and (3) hydrogen sufficient to treat the reaction product of said coal derivative and said oxirane.

The coal derivatives can be obtained by subjecting coal to reaction with nitric acid in an aqueous medium, wherein the weight ratios of coal (on a moisture-free basis and ash-free basis), nitric acid (as 100 weight percent nitric acid), and water are in the ranges of about 1:10:1 to about 1:0.1:10, preferably about 1:5:1 to about 1:0.5:5, at a temperature of about 15° to about 200° C., preferably about 50° to about 100° C., and a pressure of about atmospheric to about 1000 pounds per square inch gauge (about 100 to about 6900 kPa), preferably about atmospheric to about 500 pounds per square inch gauge (about 100 to about 3450 kPa), for about 0.5 to about 15 hours, preferably about two to about six hours. The aqueous nitric acid used generally has a concentration of about five to about 90 weight percent, preferably about 10 to about 70 weight percent. At the end of the reaction period, the reaction product is treated to remove water, unreacted nitric acid and/or ash therefrom that may be in any conventional or suitable manner, for example, by filtration, evaporation, etc., and the product remaining is the monocyclic, polycyclic, multifunctional carboxylic acid coal derivative ("coal derivative") used herein. The functional groups that can be present include hydroxyl, carboxyl, ether, ester, introgen-containing functionalities, such as nitro, etc. Exemplary procedures, for example, that can be used herein, and whose disclosures are incorporated herein, are those employed in U.S. Pat. Nos. 4,052,448; 4,137,418; 4,147,882; 4,195,185; and 4,195,186; all of Schulz et al, 1977, and in our copending U.S. patent application Ser. No. 290,662, entitled "Process for Preparing Organic Acids," filed Aug. 6, 1981.

The second component required for the preparation of the novel composition of matter defined and claimed herein is an oxirane or a mixture of oxiranes. An example of oxiranes that can be used herein are those defined by the following formula:

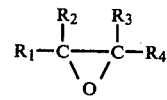

wherein $R_1$, $R_2$, $R_3$ and $R_4$, the same or different, can be hydrogen or straight- or branched-chain alkyl groups, preferably straight-chain, having from one to 10 carbon atoms, preferably from one to three carbon atoms. Particularly desirable oxiranes for use herein are ethylene oxide and propylene oxide.

The third component required is hydrogen sufficient to treat the reaction product of said coal derivative and said oxirane.

The amounts of coal derivatives and oxirane used can vary over a wide range, but in general for each 100 grams of coal derivative there are used from about 0.1 to about 10 mols of oxirane, preferably from about 0.3 to about 5.0 mols of oxirane.

The first step required in the preparation of the novel composition herein suitable for molding involves heating a stirred mixture of said coal derivative and said oxirane at a temperature of about 25° to about 200° C., preferably about 35° to about 150° C., and a pressure of about atmospheric to about 4500 pounds per square inch gauge, or even higher (about 100 to about 31,000 kPa); preferably about atmospheric to about 1000 pounds per square inch gauge (about 100 to about 6900 kPa), for about 10 minutes to about 120 hours, preferably about 30 minutes to about 10 hours. No solvent is required, but if one is used it need only be used in amounts sufficient to maintain the contents of the reactor in the liquid phase. Polar solvents, including water, can be used. Examples of such solvents include methanol, ethanol, tetrahydrofuran, combinations thereof, etc. The reaction can be carried out with a catalyst, but in a preferred embodiment, no catalysts are employed. Either base or acid catalysts can be used. By "base catalyst" we mean to include compounds that will function as an electron donor, for example, alkali metal hydroxides, such as sodium hydroxide, amines, such as triethylamine, etc. By "acid catalyst" we mean to include compounds that will function as electron acceptors, for example, Lewis Acids, such as boron trifluoride and tin octanoate, Bronsted acids, such as para-toluene sulfonic acid and sulfuric acid, etc. The amount of catalyst used can range up to about five weight percent, but preferably in the range of about 0.1 to about 1.0 weight percent, based upon the coal derivative. If a solvent has been used, the same can be removed from the reaction product at the end of the reaction in any convenient manner, for example, by distillation or evaporation. If excess oxirane is present, it can also be removed by distillation or evaporation.

The second step required in the preparation of the novel composition herein suitable for molding involves heating a stirred mixture of the reaction product of said coal derivative and said oxirane, obtained above, with hydrogen in contact with hydrogenation catalyst in a temperature range of about 25° to about 350° C., preferably about 40° to about 170° C., while maintaining a hydrogen pressure of about atmospheric to about 4500 psig (about 101 to about 31,000 kPa), or even higher, preferably about 900 to about 1000 psig (about 6210 to about 6900 kPa) for a period of about one second to about 120 hours, or even longer, but preferably about ten seconds to about 12 hours. Polar solvents, such as methanol, ethanol, tetrahydrofuran, etc., can be used as the reaction medium. In a preferred embodiment, the same solvent that may have been used in the reaction of the coal derivative with the oxirane is used. In fact, isolation of the reaction product of the coal derivative with the oxirane from the reaction mixture is not required prior to its treatment with hydrogen as defined above. all that would need be done, in such case, is to add catalyst to the reaction mixture and treat the total products with hydrogen as set forth above. The treatment with hydrogen can be carried out in the presence of any suitable hydrogenation catalysts, such as ruthenium, platinum, palladium, iron, nickel, cobalt, copperchromite, combinations of the above, etc. These catalysts can be used as such as they can be mounted on any suitable support, such as carbon, alumina, kieselguhr, etc. The amount of hydrogenation catalyst used can vary over a wide range, from as little as about 0.1 weight percent up to about 50 weight percent, or even higher, but preferably from about 0.1 to above five weight percent, based on the weight of the coal derivative used in the reaction with the oxirane. At the end of the reaction, the hydrogenation catalyst can be removed from the treated product by filtration. Solvent can be removed in any suitable manner, for example, by distillation or evaporation.

The resulting novel compositions obtained above, by reacting the coal derivative with the oxirane and then subjecting the resulting reaction product to treatment with hydrogen, is capable of being cured to a solid resinous material by reacting the same with a member selected from the group consisting of organic dicarboxylic acids, organic polycarboxylic acids, anhydrides of said acids and esters of said acids and of said anhydrides. In fact, any di- or polycarboxylic organic acid and their corresponding anhydrides and esters carrying at least two carboxyl groups, at least two ester groups or at least one anhydride group can be used. Thus mention can be made of aliphatic acids, di- or polycarboxylic, and esters and anhydrides corresponding thereto, having from two to 20 carbon atoms, preferably from three to eight carbon atoms, and aromatic acids having from eight to 200 carbon atoms, preferably from eight to 100 carbon atoms, and a corresponding anhydrides and esters thereof. Specific examples of such compounds that can be used include:

oxalic acid,
malonic acid,
succinic acid,
sebacic acid,
1,4-cyclohexanedicarboxylic acid, the linear and cyclic anhydrides obtainable therefrom, and the corresponding methyl, ethyl, propyl and butyl esters thereof,
o-, m- and p-phthalic acids,
trimelitic acid,
pyromelitic acid,
uvitic acid,
2,4'-benzophenonedicarboxylic acid,
4,4'-benzophenonedicarboxylic acid,
3,3',4,4'-benzophenonetetracarboxylic acid,
1,4-naphthalenedicarboxylic acid,
1,7-naphthalenedicarboxylic acid,
mixed aliphatic, aromatic polycarboxylic acids, such as the nitrocarboxylic acids, obtained as a result of the nitric acid oxidation of coal as exemplified, for example, in U.S. Pat. Nos. 4,052,448 to Schulz et al., 4,137,418 to Schulz et al., 4,147,882 to Schulz et al., 4,150,040 to Schulz, 4,195,185 to Schulz et al., and 4,195,186 to Schulz et al., anhydrides obtainable therefrom, for example as in U.S. Pat. No. 4,150,040 to Schulz, referred to above, and the corresponding methyl, ethyl, propyl and butyl esters thereof.

The weight ratio of the di-or polycarboxylic acid, or their anhydride or ester counterpart, to the novel composition, defined above, used in preparing the solid resinous material can be in the range of about 1:30 to about 10:1, preferably about 1:10 to about 2:1. In a preferred embodiment, the amount of acid, or its anhydride or ester counterpart used per 100 grams of the novel composition reacted therewith can be calculated by reference to the following:

$$\frac{\text{Molecular Wt of Organic Acid, Ester or Anhydride}}{\text{Number of Carbonyl Groups, Carboxyl Groups or Ester Equivalent Anhydrides}} \times \frac{n}{10}$$

wherein n is an integer from 4 to 15, preferably from 6 to 10. In a preferred embodiment, to increase the hardness of the cured solid resinous material, prior to curing the components defined above, can be mixed with a filler, such as glass fibers, sand, clay, chalk, etc. When fillers are used, the weight ratio thereof to the weight of the two reactant components, the novel composition and the organic acids, esters or anhydrides, can be about 20:1 to about 1:20, preferably about 4:1 to about 1:1. Prior to molding, or curing, an acid catalyst can be added to the molding mixture in a weight ratio of about 0.001:1 to about 0.1:1, preferably about 0.001:1 to about 0.004:1. By "acid catalyst" we mean to include compounds that will function as electron acceptors, for example, Lewis Acids, such as tin octonate, Bronsted acids, such as paratoluene sulfonic acid, etc. Preferably, in order to facilitate the subsequent molding operation, the mixture is precured by heating the same at a temperature of about 70° to about 240° C., preferably about 90° to about 180° C., for about 30 minutes to about 24 hours, preferably about one to about 1.5 hours.

The desired solid resinous product is obtained by subjecting the above composition, for example, in a mold, to a temperature of about 140° to about 250° C., preferably about 150° to about 200° C., and a pressure of about 500 to about 20,000 pounds per square inch gauge (about 3450 to about 138,000 kPa), preferably about 2000 to about 5000 pounds per square inch gauge (about 13,800 to about 34,500 kPa), for about five seconds to about 24 hours, or even higher, preferably about 15 seconds to about 30 minutes.

The product obtained is a hard, structurally stable resinous product highly resistant to chemical attack from water, acids and bases and will possess excellent insulating properties.

DESCRIPTION OF PREFERRED EMBODIMENTS

In each of the two coal derivative preparation examples described below, a German Braunkohle was used having the following analysis, on a moisture-free basis:

64.37 wt % carbon;
5.06 wt % hydrogen;
25.09 wt % oxygen;
0.14 wt % sulfur;
0.605 wt % nitrogen; and
3.88 wt % ash.

The coal contained 10.0 weight percent water.

EXAMPLE I

To a flask containing 70 grams of 70 weight percent aqueous nitric acid, there was added over a period of 55 minutes a slurry containing 54.0 grams, on a moisture-free basis, of the above coal and 115 grams of water. During the operation, the contents were constantly stirred and maintained at atmospheric pressure and at a temperature of 55° C. At the end of the addition period, the contents of the flask were maintained at 55° C., for an additional hour. During the operation, any nitrogen oxides that may have formed were permitted to escape from the reaction zone. At the end of the reaction the contents of the flask were subjected to a vacuum of 28 inches of mercury and 42° C. to remove water therefrom, and the water was analyzed for its nitric acid concentration and was found to have a nitric acid concentration of 11.5 percent. The remaining solids, amounting to 65.5 grams, were exhaustively extracted at ambient temperature and pressure with methanol. The extract was subjected to a vacuum of 28 inches of mercury and 13° C. to remove methanol therefrom. The amount of solvent-insoluble material amounted to 20.3 g, while the amount of solvent-soluble material, herein defined as "Coal Derivative A", amounted to 40.9 grams.

EXAMPLE II

This example is similar to Example I except that the coal was added to the reaction zone in two separate stages. In the first stage, the slurry added to the nitric acid in the flask contained 45 grams of coal, on a moisture-free basis, and 90 grams of water. This time the holding period after the addition of the slurry was one-half hour. At the end of the one-half hour holding period there was added to the reactor contents a second slurry containing nine grams of coal, on a moisture-free basis, and 25 grams of water over a ten-minute period while the temperature was maintained at 55° C., as in the first stage addition. The contents of the reactor were held at one hour at 55° C. Water and any remaining nitric acid were then removed, as described in Example I, yielding a solid material. Following exhaustive methanol extraction and subsequent removal of the solvent from the extract, as described in Example I, a solvent-insoluble material and a solvent-soluble material, the latter herein defined as "Coal Derivative B," were isolated.

EXAMPLES III to X

To a one-liter autoclave vessel, equipped with a stirrer, were added 100 grams of Coal Derivative A and 425 grams of propylene oxide. The reaction mixture was heated with constant stirring to 130° C., and this temperature was maintained for one hour. Prior to cooling, the pressure amounted to 130 psig (897 kPa). At the end of the reaction period, the contents of the vessel were subjected to a vacuum of 28 inches of mercury and 12° C. to remove unreacted oxirane therefrom. The remaining solids, amounting to 150 grams, were used in the subsequent hydrogenation treatment, described hereinafter. The data for this run, designated Example III, are set forth below in Table I. A similar run, designated Example IV in Table I below, involved the use of Coal Derivative B in place of Coal Derivative A.

An additional series of runs was carried out, as in Example I, but wherein different combinations, and amounts, of a designated coal derivative and propylene oxide and solvents were used. At the end of the reaction the solvents were removed along with the unreacted oxirane. These data are summarized below as Examples V to VIII.

In Examples IX and X in Table I are summarized data similar to Examples V to VIII, but wherein the reaction product was not treated to remove solvent and any unreacted oxirane therefrom.

TABLE I

| Example | Coal Derivative | Grams of Coal Derivative | Grams of Oxirane | Solvent | Milliliters of Solvent | Temp., °C. | Time, Hrs. |
| --- | --- | --- | --- | --- | --- | --- | --- |
| III | A | 100 | 425 | None | None | 130 | 1.0 |
| IV | B | 100 | 425 | None | None | 130 | 1.0 |
| V | A | 100 | 60.5 | THF | 300 | 130 | 1.0 |
| VI | B | 100 | 57.0 | THF | 280 | 130 | 1.0 |
| VII | B | 100 | 57.0 | Methanol | 290 | 130 | 1.0 |
| VIII | A | 100 | 57.0 | Methanol | 290 | 130 | 1.0 |
| IX | A | 100 | 57.0 | THF | 280 | 130 | 1.0 |
| X | B | 100 | 57.0 | THF | 280 | 130 | 1.0 |

THF: tetrahydrofuran

EXAMPLES XI to XVIII

To a one-liter autoclave vessel, equipped with a stirrer, were added 130 grams of the Coal Derivative-oxirane reaction product of Example XIII, 3.0 grams of activated OP104 nickel catalyst and 275 grams of solvent. The reaction mixture was pressured with hydrogen to a pressure of 300 psig (2070 kPa) at a temperature of 18° C. The system was stirred for 15 minutes, stirring was then discontinued, and the pressure vented to atmospheric. This purging procedure was repeated three times to insure removal of oxygen from the system. The reaction mixture was then heated with constant stirring to 140° C. At this temperature the system was pressured with hydrogen to 1000 psig (6900 kPa). The temperature was allowed to increase to about 160° C., but not above 170° C. This temperature range was maintained for the duration of this reaction. The pressure of the system was allowed to decrease from 1000 psig (6900 kPa) but not below 900 psig (6210 kPa), at which time additional hydrogen was introduced in the autoclave. The process was repeated until the pressure remained constant at 1000 psig (6900 kPa). After cooling, the contents of vessel were subjected to a vacuum of 28 inches of mercury and 65° C. to remove solvent therefrom. The remaining solids, amounting to 148 grams, were used for molding. The results of this run are summarized below in Table II as Example XIII. Examples XIV to XVIII, also summarized below, were similarly conducted except that reactants and conditions were varied. Two runs, Examples XI and XII, similarly summarized in Table II, were carried out in the same manner as the others herein, except that the entire contents of the reaction mixture resulting from the reaction of the coal derivative and the oxirane were used and catalyst merely added thereto prior to hydrogenation.

TABLE II

| Example | Product from Example, | Grams | Grams of Catalyst | Solvent | Milliliters of Solvent | Temperature, °C. | Time, Hours |
|---|---|---|---|---|---|---|---|
| XI | IX | 150 | 3.5 | THF | 280 | 140–165 | 4.0 |
| XII | X | 150 | 3.5 | THF | 280 | 140–160 | 4.5 |
| XIII | III | 130 | 3.0 | THF | 300 | 140–165 | 4.0 |
| XIV | VII | 100 | 25.0 | THF | 300 | 140–166 | 3.5 |
| XV | VIII | 90 | 2.0 | THF | 320 | 140–162 | 4.5 |
| XVI | V | 140 | 3.5 | THF | 280 | 140–166 | 5.0 |
| XVII | IV | 150 | 3.5 | THF | 280 | 140–161 | 5.0 |
| XVIII | VI | 150 | 3.5 | THF | 270 | 140–168 | 4.5 |

EXAMPLES XIX TO XXXIV

A selected amount of the product obtained from the runs summarized in Table II was well mixed with a defined acid component, catalyst and filler. This mixture was then precured by heating at atmospheric pressure and selected temperatures and for selected periods of time, after which the mixture was placed in a die and molded at selected temperatures and pressures for selected periods of time. The results of these runs are summarized below in Table III.

TABLE III

| Ex. | Prod. from Ex., | Wt % | Acid, Wt % | Filler, Wt % | Catalyst, Wt % | Precure Temp. °C. | Precure Time, Hrs. | Molding Temp. °C. | Molding Time, Min. | Molding Pressure psig (KPa) | Barcol Hardness |
|---|---|---|---|---|---|---|---|---|---|---|---|
| XIX | XI | 10.1 | Coal Deriv A, 19.1 | Sand, 70.5 | Tin octanoate, 0.3 | 100 | 1.5 | 165 | 30 | 2700 (18,630) | 46 |
| XX | XII | 11.3 | Coal Deriv B, 11.3 | Sand, 77.1 | Tin octanoate, 0.3 | 105 | 1.0 | 165 | 33 | 2500 (17,250) | 50 |
| XXI | XIII | 11.3 | Coal Deriv A, 11.3 | Sand, 57.0 Glass Fiber 20.1 | Tin octanoate, 0.23 octanoate, 0.23 | 100 | 1.0 | 165 | 35 | 2500 (17,250) | 57 |
| XXII | XIV | 24.5 | Coal Deriv B, 21.5 | Sand, 53.9 | Tin octanoate, 0.1 | 100 | 2.5 | 175 | 60 | 2500 (17,250) | 40 |
| XXIII | XV | 9.8 | Coal Deriv B, 39.1 | Sand, 77.1 | Tin octanoate, 0.3 | 105 | 1.0 | 165 | 33 | 2200 (15,180) | 26 |
| XXIV | XV | 12.8 | Coal Deriv A, 12.8 | Sand, 74.2 | Tin octanoate, 0.2 | 100 | 0.25 | 165 | 0.05 | 2700 (18,630) | 39 |
| XXV | XVI | 13.0 | Coal Deriv B, 13.0 | Sand, 73.99 | Tin octanoate, 0.01 | 115 | 1.5 | 165 | 0.1 | 100 (690) | 44 |
| XXVI | XVII | 27.24 | Coal Deriv A, 27.24 | Sand, 45.41 | Tin octanoate, 0.09 | 105 | 3.0 | 180 | 3.0 | 4000 (27,600) | 40 |
| XXVII | XVIII | 27.24 | Coal Deriv B, 27.24 | Sand, 45.41 | Tin octanoate, 0.09 | 150 | 0.25 | 180 | 45 | 4000 (27,600) | 39 |
| XXVIII | XVII | 27.24 | Coal Deriv A, 27.24 | Sand, 45.41 | *, 0.09 | 150 | 0.5 | 180 | 30 | 2700 (18,630) | 40 |
| XXIX | XIV | 24.5 | Coal Deriv B, 27.24 | Sand, 53.9 | *, 0.1 | 150 | 0.5 | 180 | 15 | 2200 (15,180) | 40 |
| XXX | XVIII | 27.24 | Coal Deriv A, 27.24 | Sand, 45.41 | Tin octanaote, 0.09 | 150 | 0.5 | 180 | 1 | 2500 (17,250) | 38 |
| XXXI | XVI | 13.0 | Coal Deriv A, 13.0 | Sand, 73.99 | Tin octanoate, 0.01 | 180 | 0.25 | 200 | 0.5 | 3300 (22,770) | 45 |
| XXXII | XVIII | 18.0 | **, 12.0 | Sand, 69.97 | Tin octanoate, 0.01 | 150 | 1.0 | 180 | 35 | 2500 (17,250) | 33 |
| XXXIII | XI | 19.0 | ***, 8.0 | Sand, 72.9 | Tin octanoate, 0.1 | 180 | 0.5 | 200 | 30 | 4000 (27,600) | 39 |
| XXXIV | XII | 14.3 | Coal Deriv A, 14.3 | Sand, 31.3 Glass Fiber 40.0 | Tin octanoate, 0.1 | 150 | 0.5 | 180 | 5 | 4000 (27,600) | 54 |

(*) p-toluenesulfonic acid
(**) 4,4'-benzophenonedicarboxylic acid
(***) 3,3',4,4'-benzophenonetetracarboxy acid From Table III it can be seen that in each example a solid resinous material was obtained having an excellent Barcol hardness. Each of the materials, moreover, exhibited excellent structural strength, was highly resistant to chemical attack and possessed excellent insulating properties. The molded products demonstrated heat distortion temperature ranges of about 100° to about 130° C.

Obviously, many modifications and variations of the invention, as hereinabove set forth, can be made without departing from the spirit and scope thereof, and therefore only such limitations should be imposed as are indicated in the appended claims.

We claim:

1. A novel composition of matter capable of being cured to a solid resinous material obtained by reacting (1) a coal derivative comprising a mixture of monocyclic, polycyclic, multifunctional carboxylic acids resulting from the interaction of coal with nitric acid with (2) an oxirane defined by the following formula:

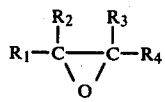

wherein $R_1$, $R_2$, $R_3$ and $R_4$, the same or different, can be hydrogen or an alkyl group having from one to 10 carbon atoms, and then subjecting the resulting reaction product to treatment with hydrogen.

2. The novel composition of claim 1 wherein $R_1$, $R_2$, $R_3$ and $R_4$, the same or different, can be hydrogen or an alkyl group having from one to three carbon atoms.

3. The novel composition of claim 1 wherein said oxirane is ethylene oxide.

4. The novel composition of claim 1 wherein said oxirane is propylene oxide.

5. The novel composition of claim 1 wherein said coal derivative is obtained by subjecting coal to reaction with nitric acid in an aqueous medium, wherein the weight ratios of coal, nitric acid and water are in a weight ratio of about 1:10:1 to about 1:0.1:10 at a temperature of about 15° to about 200° C. and a pressure of about atmospheric to about 1000 pounds per square inch gauge for about 0.5 to about 15 hours.

6. The novel composition of claim 1 wherein said coal derivative is obtained by subjecting coal to reaction with nitric acid in an aqueous medium, wherein the weight ratios of coal, nitric acid and water are in a weight ratio of about 1:5:1 to about 1:0.5:5 at a temperature of about 50° to about 100° C. and a pressure of about atmospheric to about 500 pounds per square inch gauge for about two to about six hours.

7. The novel composition of claim 5 wherein the coal derivative, comprising a mixture of monocyclic, polycyclic, multifunctional carboxylic acids resulting from the interaction of coal with nitric acid, prior to reaction with said oxirane, is subjected to drying to remove water therefrom.

8. The novel composition of claim 6 wherein the coal derivative, comprising a mixture of monocyclic, polycyclic, multifunctional carboxylic acids resulting from the interaction of coal with nitric acid, prior to reaction with said oxirane is subjected to drying to remove water therefrom.

9. The novel composition of claim 7 wherein a polar solvent extract of said coal derivative is reacted with said oxirane.

10. The novel composition of claim 8 wherein a polar solvent extract of said coal derivative is reacted with said oxirane.

11. The novel composition of claim 7 wherein a methanol extract of said coal derivative is reacted with said oxirane.

12. The novel composition of claim 8 wherein a methanol extract of said coal derivative is reacted with said oxirane.

13. The novel composition of claim 7 wherein an ethanol extract of said coal derivative is reacted with said oxirane.

14. The novel composition of claim 8 wherein an ethanol extract of said coal derivative is reacted with said oxirane.

15. The novel composition of claim 1 wherein about 0.1 to about 10 mols of oxirane are used for each 100 grams of coal derivative and the reaction is carried out at a temperature of about 25° to about 200° C. and a pressure of about atmospheric to about 4500 pounds per square inch gauge for about 10 minutes to about 120 hours.

16. The novel composition of claim 1 wherein about 0.3 to about 5.0 mols of oxirane are used for each 100 grams of coal derivative and the reaction is carried out at a temperature of about 35° to about 150° C. and a pressure of about atmospheric to about 1000 pounds per square inch gauge for about 30 minutes to about 10 hours.

17. The novel composition of claim 1 wherein said treatment with hydrogen involves contacting said resulting reaction product with hydrogen in contact with a hydrogenation catalyst in a temperature range of about 25° to about 350° C. while maintaining a hydrogen pressure thereon of about atmospheric to about 4500 pounds per square inch gauge for about one second to about 120 hours.

18. The novel composition of claim 17 wherein the temperature is about 40° to about 170° C., the pressure is about 900 to about 1000 pounds per square inch gauge and the time about ten seconds to about 12 hours.

19. The novel composition of claim 13 wherein said treatment with hydrogen involves contacting said resulting reaction product with hydrogen in contact with a hydrogenation catalyst in a temperature range of about 25° to about 350° C. while maintaining a hydrogen pressure thereon of about atmospheric to about 4500 pounds per square inch gauge for about one second to about 120 hours.

20. The novel composition of claim 4 wherein said treatment with hydrogen involves contacting said resulting reaction product with hydrogen in contact with a hydrogenation catalyst in a temperature range of about 25° to about 350° C. while maintaining a hydrogen pressure thereon of about atmospheric to about 4500 pounds per square inch gauge for about one second to about 120 hours.

21. The novel composition of claim 5 wherein said treatment with hydrogen involves contacting said resulting reaction product with hydrogen in contact with a hydrogenation catalyst in a temperature range of about 25° to about 350° C. while maintaining a hydrogen pressure thereon of about atmospheric to about 4500 pounds per square inch gauge for about one second to about 120 hours.

22. The novel composition of claim 17 wherein said hydrogenation catalyst is nickel.

23. A process for producing a solid resinous material which comprises reacting the novel composition of matter of claim 1 with a member selected from the group consisting of organic dicarboxylic acids, organic polycarboxylic acids, anhydrides of said acids and esters of said acids.

24. A process for producing a solid resinous material which comprises reacting the novel composition of matter of claim 2 with a member selected from the group consisting of organic dicarboxylic acids, organic polycarboxylic acids, anhydrides of said acids and esters of said acids.

25. A process for producing a solid resinous material which comprises reacting the novel composition of matter of claim 3 with a member selected from the group consisting of organic dicarboxylic acids, organic polycarboxylic acids, anhydrides of said acids and esters of said acids.

26. A process for producing a solid resinous material which comprises reacting the novel composition of matter of claim 4 with a member selected from the group consisting of organic dicarboxylic acids, organic polycarboxylic acids, anhydrides of said acids and esters of said acids.

27. A process for producing a solid resinous material which comprises reacting the novel composition of matter of claim 5 with a member selected from the group consisting of organic dicarboxylic acids, organic polycarboxylic acids, anhydrides of said acids and esters of said acids.

28. A process for producing a solid resinous material which comprises reacting the novel composition of matter of claim 6 with a member selected from the group consisting of organic dicarboxylic acids, organic polycarboxylic acids, anhydrides of said acids and esters of said acids.

29. A process for producing a solid resinous material which comprises reacting the novel composition of matter of claim 7 with a member selected from the group consisting of organic dicarboxylic acids, organic polycarboxylic acids, anhydrides of said acids and esters of said acids.

30. A process for producing a solid resinous material which comprises reacting the novel composition of matter of claim 8 with a member selected from the group consisting of organic dicarboxylic acids, organic polycarboxylic acids, anhydrides of said acids and esters of said acids.

31. A process for producing a solid resinous material which comprises reacting the novel composition of matter of claim 9 with a member selected from the group consisting of organic dicarboxylic acids, organic polycarboxylic acids, anhydrides of said acids and esters of said acids.

32. A process for producing a solid resinous material which comprises reacting the novel composition of matter of claim 10 with a member selected from the group consisting of organic dicarboxylic acids, organic polycarboxylic acids, anhydrides of said acids and esters of said acids.

33. A process for producing a solid resinous material which comprises reacting the novel composition of matter of claim 11 with a member selected from the group consisting of organic dicarboxylic acids, organic polycarboxylic acids, anhydrides of said acids and esters of said acids.

34. A process for producing a solid resinous material which comprises reacting the novel composition of matter of claim 12 with a member selected from the group consisting of organic dicarboxylic acids, organic polycarboxylic acids, anhydrides of said acids and esters of said acids.

35. A process for producing a solid resinous material which comprises reacting the novel composition of matter of claim 13 with a member selected from the group consisting of organic dicarboxylic acids, organic polycarboxylic acids, anhydrides of said acids and esters of said acids.

36. A process for producing a solid resinous material which comprises reacting the novel composition of matter of claim 14 with a member selected from the group consisting of organic dicarboxylic acids, organic polycarboxylic acids, anhydrides of said acids and esters of said acids.

37. A process for producing a solid resinous material which comprises reacting the novel composition of matter of claim 15 with a member selected from the group consisting of organic dicarboxylic acids, organic polycarboxylic acids, anhydrides of said acids and esters of said acids.

38. A process for producing a solid resinous material which comprises reacting the novel composition of matter of claim 16 with a member selected from the group consisting of organic dicarboxylic acids, organic polycarboxylic acids, anhydrides of said acids and esters of said acids.

39. A process for producing a solid resinous material which comprises reacting the novel composition of matter of claim 17 with a member selected from the group consisting of organic dicarboxylic acids, organic polycarboxylic acids, anhydrides of said acids and esters of said acids.

40. A process for producing a solid resinous material which comprises reacting the novel composition of matter of claim 18 with a member selected from the group consisting of organic dicarboxylic acids, organic polycarboxylic acids, anhydrides of said acids and esters of said acids.

41. A process for producing a solid resinous material which comprises reacting the novel composition of matter of claim 19 with a member selected from the group consisting of organic dicarboxylic acids, organic polycarboxylic acids, anhydrides of said acids and esters of said acids.

42. A process for producing a solid resinous material which comprises reacting the novel composition of matter of claim 20 with a member selected from the group consisting of organic dicarboxylic acids, organic polycarboxylic acids, anhydrides of said acids and esters of said acids.

43. A process for producing a solid resinous material which comprises reacting the novel composition of matter of claim 21 with a member selected from the group consisting of organic dicarboxylic acids, organic polycarboxylic acids, anhydrides of said acids and esters of said acids.

44. A process for producing a solid resinous material which comprises reacting the novel composition of matter of claim 22 with a member selected from the group consisting of organic dicarboxylic acids, organic polycarboxylic acids, anhydrides of said acids and esters of said acids.

45. The process of claim 23 wherein said member is an organic dicarboxylic acid.

46. The process of claim 23 wherein said member is an organic polycarboxylic acid.

47. The process of claim 23 wherein said member is an anhydride of an organic di- or polycarboxylic acid.

48. The process of claim 23 wherein said member is an ester of an organic di- or polycarboxylic acid.

49. The process of claim 48 wherein said ester is a methyl, ethyl, propyl or butyl ester.

50. The process of claim 23 wherein said member is a coal derivative obtained by subjecting coal to reaction with nitric acid in an aqueous medium, wherein the weight ratios of coal, nitric acid and water are in a weight ratio of about 1:10:1 to about 1:0.1:10 at a temperature of about 15° to about 200° C. and a pressure of about atmospheric to about 1000 pounds per square inch gauge for about 0.5 to about 15 hours.

51. The process of claim 23 wherein said member is a coal derivative obtained by subjecting coal to reaction with nitric acid in an aqueous medium, wherein the weight ratios of coal, nitric acid and water are in a weight ratio of about 1:5:1 to about 1:0.5:5 at a temperature of about 50° to about 100° C. and a pressure of about atmospheric to about 500 pounds per square inch gauge for about two to about six hours.

52. The process of claim 23 wherein said reaction is carried out at a temperature in the range of about 140° to about 250° C., the pressure is in the range of about 500 to about 20,000 pounds per square inch gauge and the time is in the range of about five seconds to about 24 hours.

53. The process of claim 23 wherein said reaction is carried out at a temperature in the range of about 150° to about 200° C., the pressure is in the range of about 2000 to about 5000 pounds per square inch gauge and the time is in the range of about 15 seconds to about 30 minutes.

54. The process of claim 23 wherein prior to said reaction, the reactants are subjected to precuring by heating the same at a temperature in the range of about 70° to about 240° C. for about 30 minute to about 24 hours.

55. The process of claim 23 wherein prior to said reaction, the reactants are subjected to precuring by heating the same at a temperature of about 90° to about 180° C. for about one to about 1.5 hours.

56. The process of claim 23 wherein the weight ratio of said novel composition of matter to said acids, anhydrides or esters is in the range of about 1.30 to about 10:1.

57. The process of claim 23 wherein the weight ratio of said novel composition of matter to said acids, anhydrides or esters is in the range of about 1:10 to about 2:1.

58. The process of claim 23 wherein prior to reaction a filler is added to said reaction mixture such that the weight ratio of said filler to said reaction mixture is about 20:1 to about 1:20.

59. The process of claim 23 wherein prior to reaction a filler is added to said reaction mixture such that the weight ratio of said filler to said reaction mixture is about 4:1 to about 1:1.

* * * * *

UNITED STATES PATENT OFFICE
CERTIFICATE OF CORRECTION

Patent No. 4,390,661                         Dated June 28, 1983

Inventor(s) Johann G. Schulz and Daniel Margosian

It is certified that error appears in the above-identified patent and that said Letters Patent are hereby corrected as shown below:

Col. 2, line 5, "intro" should read "nitro".
Cols. 7-8, Table III, line 7 under "Catalyst, Wt %",
    delete "octanoate, 0.23".
Col. 10, line 43 (claim 19), "13" should read --3--.

Signed and Sealed this

Second Day of April 1985

[SEAL]

Attest:

DONALD J. QUIGG

Attesting Officer      Acting Commissioner of Patents and Trademarks